United States Patent [19]
Caruso, Jr. et al.

[11] 3,789,296
[45] Jan. 29, 1974

[54] MOISTURE MONITOR SYSTEM
[75] Inventors: Philip J. Caruso, Jr., 15611 Dell Prado Dr., Hacienda Heights, Calif. 91745; Lyle E. Rasmussen, Arcadia; Joseph E. Scarbrough, Cypress, both of Calif.
[73] Assignee: said Caruso, by said Rasmusen and Scarbrough
[22] Filed: June 12, 1972
[21] Appl. No.: 262,150

[52] U.S. Cl. .......................................... 324/58.5 B
[51] Int. Cl. ............................................ G01r 27/04
[58] Field of Search .................. 324/58.5 B, 58.5 R

[56] References Cited
UNITED STATES PATENTS

| | | | |
|---|---|---|---|
| 3,460,031 | 8/1969 | Evans et al. | 324/58.5 B |
| 3,500,204 | 3/1970 | Stromer | 324/58.5 B X |
| 3,364,421 | 1/1968 | Bullwinkel | 324/58.5 B X |
| 3,474,337 | 10/1969 | Petrick | 324/58.5 B |
| 3,492,464 | 1/1970 | Hill et al. | 324/58.5 B X |

Primary Examiner—Stanley T. Krawczewicz
Attorney, Agent, or Firm—Keith D. Beecher

[57] ABSTRACT
A time domain reflectometer type of electronic instrument is provided which uses pulse reflectometry techniques for precisely monitoring the water content of a monitored product. The instrument may be used, for example, to monitor the quantity of liquid latex applied as an adhesive backing coating during the manufacture of carpeting. In such a case, the instrument assures a uniform backing of sufficient latex on the carpet to perform its intended function, but without wastage. The instrument, however, has other uses, such as for monitoring the water content in the production of paper, or in textile dying processes, or the like. In the practice of the invention, the product being monitored is passed as a continuous sheet through a pair of sensor bars, and the system of the invention measures the effective dielectric constant produced by the product as it passes between the bars. The sensor bars serve as a two-wire transmission line, and the system transmits narrow electric pulses down the transmission line and receives reflected pulses therefrom. The system uses radar principles, however, the signal is completely contained between the two sensor bars and the pulse returns are continuously received from successive points across the product. The size of the return is related to the amount of moisture content at each point along the product.

11 Claims, 8 Drawing Figures

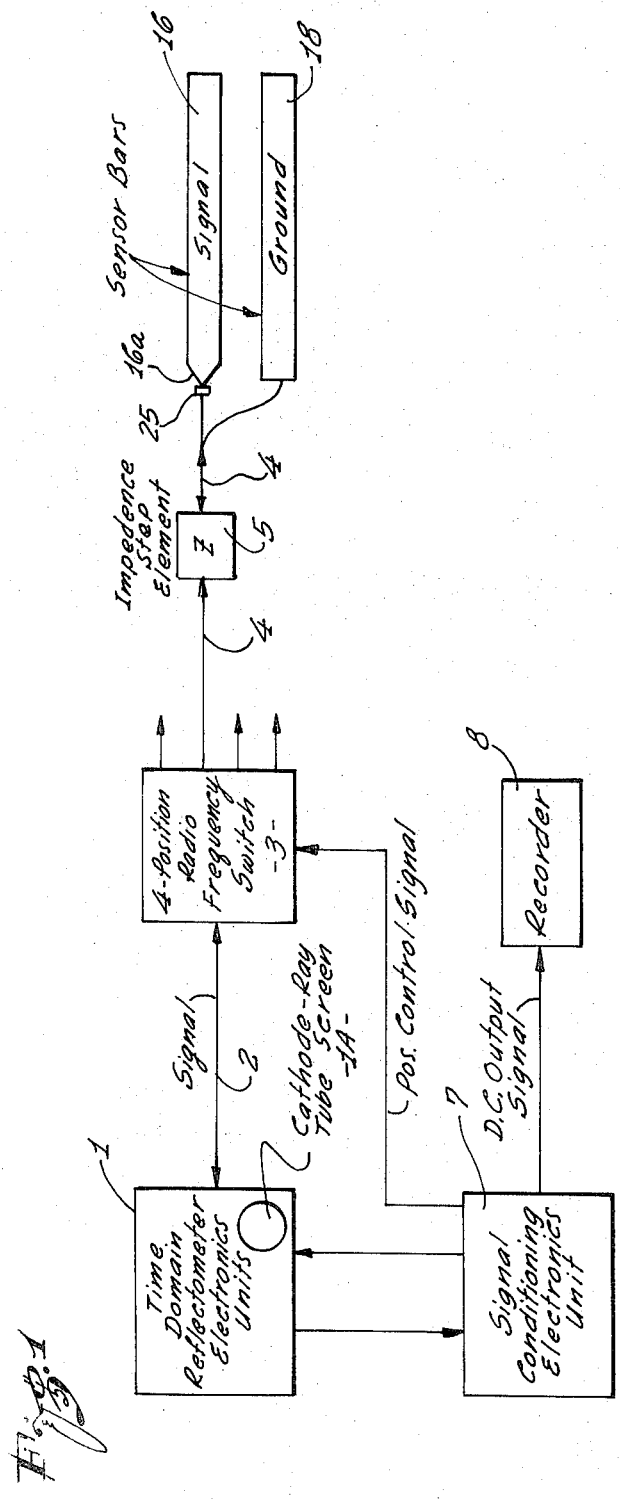
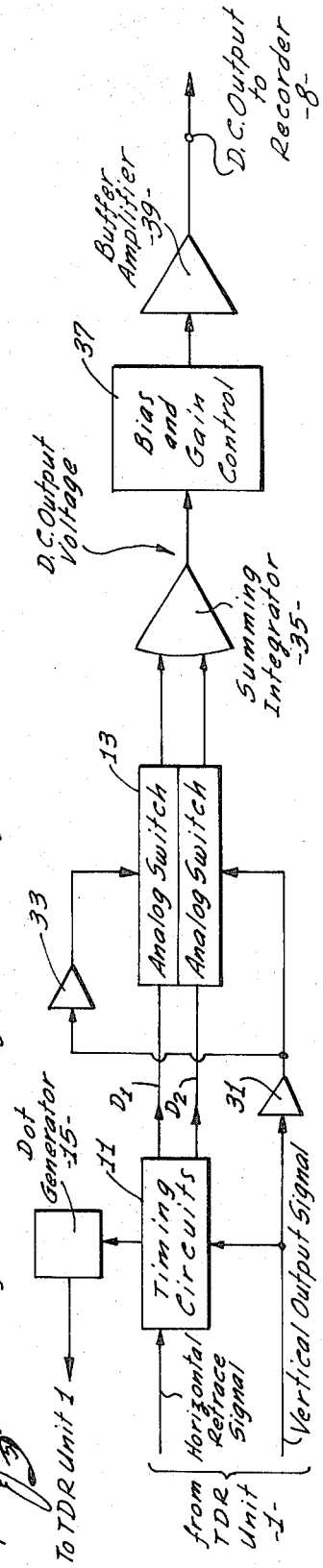

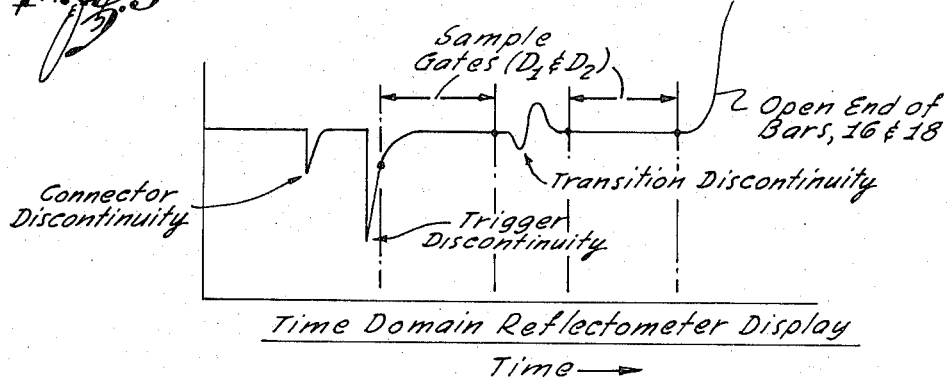
Fig. 3 — Time Domain Reflectometer Display
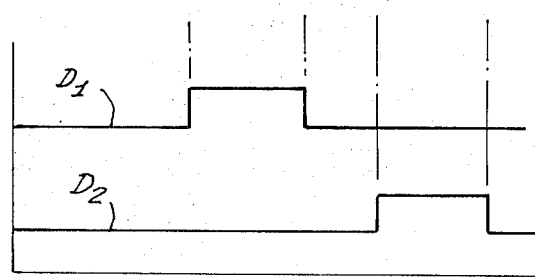
Fig. 4 — Sampling Gates Timing Diagram
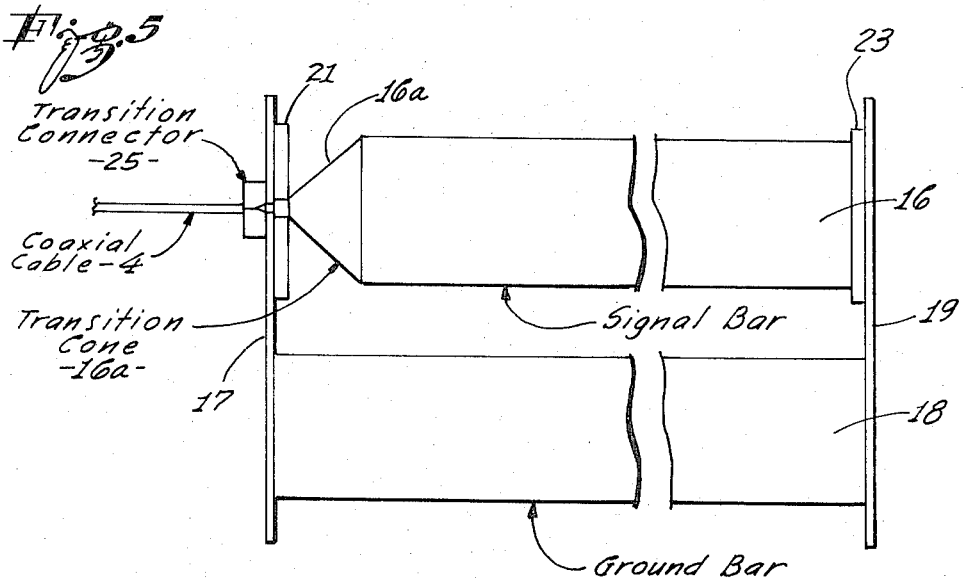
Fig. 5

Sampling Gates Timing Diagram
Time →

MOISTURE MONITOR SYSTEM

BACKGROUND OF THE INVENTION

For purposes of convenience, the system and instrument of the invention will be described in conjunction with the manufacture of carpeting, in which it is used as a continuous sensor of the liquid latex backing applied to the carpeting, as the carpeting passes as a continuous web between the two sensor bars of the instrument. It will be appreciated, however, as mentioned above, that the instrument and system of the invention has a wider utility, and it can be used in conjunction with any product to measure its moisture content, as the product is passed between the sensor bars.

In the present day manufacture of carpeting, it is the usual practice to cause a jute or canvas backing sheet to pass through the tufting machine, and the machine is controlled so that the threads of the carpet are applied to the backing. This primary backing is then passed ove a roller in accordance with usual carpet manufacturing techniques, and this roller applies a coating of latex to the underside of the backing so as to cause the carpet threads to be adhesively attached to the backing and also to a secondary backing. The resulting assembly is then usually baked in an oven to dry and vulcanize the latex.

It is important in the manufacture of the carpet that an adequate amount of latex be maintained. However, in maintaining an adequate amount of latex in accordance with the prior art practice, overages of latex are often encountered, with resulting wastage. The apparatus of the present invention provides an all electronic instrument which requires no moving parts, and yet which provides a continuous measurement of the average amount of latex applied over the entire width of the carpet as the carpet passes through the sensor bars of the instrument. In addition, the apparatus of the invention is capable of indicating any departure beyond a pre-selected amount of latex across the width of the carpet from the aforesaid average.

Pulse reflectometry has been used for many years for locating and identifying imperfections and defects in power and coaxial transmission lines. In such uses, it is related to radar in that it is one-dimensional, closed-loop pulse reflection, distance-measuring technique.

It is known that when a pulse is impressed on a uniform transmission line having an impedance discontinuity along its length, a portion of the signal will be reflected by the discontinuity and will return to the input end of the transmission line. In the testing of transmission lines for faults, the distance between the input end of the uniform transmission line and a fault is determined by detecting the time interval required for the pulse to travel to and return from the fault or discontinuity.

As mentioned above, the apparatus of the invention applied time domain reflectometer pulse reflectometry principles to measure changes in the effective dielectric constant, impedance, and loss produced by the quantity of latex present between the sensor bars, as the carpet is drawn through the sensor bars. Time domain reflectometry uses a step generator and an oscilloscope, and it constitutes a system which may be analogized to a "closed-loop radar" system. In the time domain reflectometer system, a voltage step is propagated down a transmission line, and the incident and reflected voltage waves are monitored by the oscilloscope at a particular point on the line. The resulting echo technique reveals at a glance the characteristic impedance of the transmission line. Moreover, the system shows both the position and the nature of each discontinuity along the line.

Dielectric measurements may be made by time domain reflectometer techniques, such as described in "Application Note 118 – Dielectric Measurement With Time Domain Reflectometry" published March 1970 by Hewlett-Packard. As described in the publication, one can obtain dielectric measurements over a wide frequency range in a fraction of a second by use of time domain reflectometer techniques, and by which measurements are made in a time domain, rather than in a frequency domain.

Basically, the instrument and apparatus of the present invention measures the changes in effective dielectric constants produced by a change in the quantity of latex present between the aforesaid sensor bars as the carpet assembly is drawn between the bars. As mentioned above, the operation is analogous to a closed circuit radar system, a reflection being obtained whenever a change in dielectric constant is encountered. A sampling unit accepts the reflections and converts them to a varying voltage which can be monitored on an oscilloscope.

The electronic system of the invention comprises two major units, namely, the electronic unit and the sensor bar assembly. The electronic unit includes the signal source and the receiver, as well as a visual display unit for the instantaneous signals, such as an oscilloscope. The electronic unit also includes appropriate averaging circuitry, and it is coupled, for example, to a strip recorder for achieving a permanent record of the reading. In a constructed embodiment of the invention, all the active elements of the system are contained in the electronic unit, with only one connection being required to the sensor bar assembly, and this connection being in the form, for example, of a coaxial cable.

Several sets of sensor bars may be used with one electronic unit in the apparatus of the invention, so as to permit monitoring to be economically carried out at several points in the manufacturing process. Switching between the pairs of sensor bars may be carried out simply by connecting a different cable to the input of the electronic unit through an appropriate switching device. A single front panel adjustment can be made to compensate for the different lengths of coaxial line to each of the pairs of sensor bars, however, in normal operation all lines are of the same length for the sake of simplicity when operated in the automatic mode.

The sensor bar assembly itself, in the apparatus of the invention, may comprise two aluminum tubes or bars which may, for example, have a diameter within the range of 4 inches to 6 inches. The two bars are spaced apart sufficiently to allow the carpet being manufactured to pass closely between them. It will be appreciated that the exact size and shape of the sensor bars can be varied to suit the individual installation, and depends primarily on the required spacing between the sensor, that is, the maximum thickness of carpet to be encountered. When the sensor bars are made of aluminum, they are light in weight, for example, less than 30 pounds each. It should be pointed out that the sensor bars can also be operated with a disposable paper or plastic covering for facilitating the cleaning operation,

BRIEF DESCRIPTION OF THE DRAWINGS

FIG. 1 is a block diagram showing diagrammatically the sensing apparatus and system of one embodiment of the invention;

FIG. 2 is a logic diagram of certain components of the system of FIG. 1;

FIG. 3 is a curve representing the display from a time domain reflectometer component of the system of FIG. 1;

FIGS. 3, 4 and 4A are timing diagrams useful in explaining the operation of the logic diagram of FIG. 2;

FIG. 5 is a schematic representation of a pair of sensor bars used in the apparatus of the invention.

DETAILED DESCRIPTION OF THE ILLUSTRATED EMBODIMENT

Figure 4A:
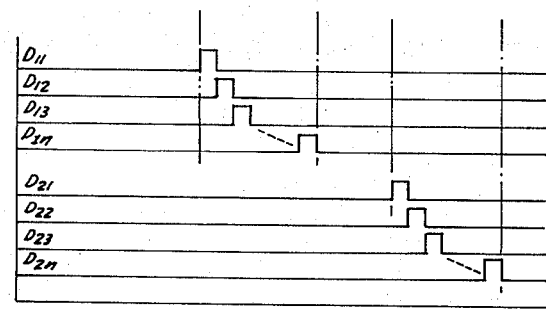

The instrument shown in FIG. 1 includes a time domain reflectometer electronics unit 1 which may be of the type described above, and which generates narrow electric pulses over a coaxial cable 2 to a four position radio frequency switch 3. The radio frequency switch 3 is connected through a coaxial cable 4 to an impedance step element 5 which, in turn, is connected to a pair of sensor bars 16 and 18. The switch serves to connect the system selectively to other sensor bars for multiple detection purposes. The unit 1 is also connected to a signal conditioning electronics unit 7 which generates a position control signal for the switch 3, and which also generates a direct current output signal for a recorder 8.

The sensor bars 16 and 18 are mounted in spaced relationship, and the top bar is insulated at each end. As shown in FIG. 5, for example, the sensor bars may be mounted between a pair of mounting plates 17 and 19. The sensor bar 16 constitutes the signal bar, and the sensor bar 18 constitutes the ground bar. A pair of insulators 21 and 23 are interposed between the ends of the signal bar 16 and the mounting plate. A transition cone 16a is formed at one end of the signal bar 16, and a transition connector 25 connects the signal bar to the coaxial cable 4.

The sensor bars 16 and 18 are mounted so as to permit the product, such as a carpet, to pass between them as a continuous web. The bars are installed and used as a pair of parallel transmission lines. The impedance of the bars is determined by their spacing and the resultant dielectric constant between them. This is normally adjusted to match the impedance of the coaxial transmission line for feeding the bars.

The bars may be fabricated from aluminum pipes, and each has a length to fit the requirements of the particular application. The diameter of the pipes is dependent upon the sensitivity required for any particular application. The mounting plates 21 and 23 may consist of aluminum plate that may, for example, be one-fourth of an inch thick with mounting holes for the pipes and for an appropriate holding frame.

The transition cone 16a may be constructed of aluminum with, for example, a 31.5° transition taper. The small end of the cone may be 0.5 inches in diameter, and the large end is matched to the diameter of the pipe 16. The cone may be mounted in the pipe 16 in a press fit into the end of the pipe. The insulators 21 and 23 are used to prevent the signal bar 16 from coming into electrical contact with the mounting frame, and these insulators may be formed of any appropriate material having a low dielectric constant.

The transition connector 25 is used to connect the output of the transmission line into a parallel transmission line. The connector may be constructed of an aluminum shell with a step tapered pin held in place with a low dielectric constant epoxy material. One end of the tapered pin receives the center conductor of the coaxial cable 4, while the other end may be inserted into a one-half inch shaft protruding through the insulator. The conductive sheath of the coaxial cable is then attached to the shell of the connector to complete the ground circuit.

Variations in the output signal of the unit 1 with time are precisely equivalent to changes of the impedance at any given position along the transmission line formed by the sensor bars 16 and 18. The change of impedance can be simple or complex, depending upon the effect being measured. If there is only a reactive change in the impedance, which can be produced by a change in dielectric constant of the capacitance term, then the impedance beyond that capacitance will not be effected. However, if there exists a complex change of impedance along the line formed by the sensor bars 16 and 18, then the impedance beyond that complex change will be attenuated by the resistive term. The effect of such a distributed complex impedance, such as occurs when the instrument is used to measure a dielectric, such as that of the liquid latex applied to the back of a tufted carpet, is to produce a non-linear slope even for a linear coating of latex. Moreover, all impedance changes beyond that point are attenutated because of its resistive term.

A differential process is used in the system of FIG. 1 to eliminate the effects of drift in the system which would appear as changes in impedance. This is achieved by producing two gates of equal length in the signal conditioning electronics unit 7. The gates sample the waveform of the output signal of the unit 1 at two places, with one sample signal being inverted with respect to the other. The two samples are then summed in an integrator in the unit 7, and the resulting direct current output signal, which is directly proportional to the average difference of impedance in the sample areas, is applied to the recorder 8 for recording purposes.

As shown in FIG. 2, the signal conditioning electronics unit 7 includes timing circuits represented by a block 11 which responds to the horizontal retrace signal and vertical output signal from the unit 1 to produce a pair of gate signals D1 and D2 (FIG. 4) which are applied to analog switches 13. The timing circuits 11 also control a dot generator 15 which returns a signal to the unit 1. The vertical output signal is also applied through an operational amplifier 31 and inverter 33 to the analog switches 13, as shown. The gated outputs from the analog switches are applied to a summing integrator 35 which, in turn, is connected through appropriate bias and gain controls 37 to a buffer amplifier 39. The DC output from the buffer amplifier is applied to the recorder 8 of FIG. 1.

The gate signal corresponding to $D_1$ in FIGS. 3 and 4 is a "reference" gate, which will remain at a constant impedance since this sample corresponds to a portion of a length of coaxial cable 4 connecting the impedance step element 5 to the transition 25 (FIG. 1). The impedance step element 5 is used to provide a trigger discontinuity such as shown in the curve of FIG. 3. The second sample gate is adjusted so that the gate signal $D_2$ corresponds with 2 points approximately 1 foot inside the edges of the product being monitored, as a continuous web of the product passes between the sensor bars 16 and 18 of FIG. 1 and into the plane of the diagram of FIG. 1.

As shown in FIG. 4A, the analog switch driver may be broken into a number $(n)$ of intervals of equal length. Each set of corresponding intervals may be used to drive a separate data channel such as shown in FIG. 2. In this manner, gate signals $D_{11}$ and $D_{21}$ would be used to drive the analog switches of a channel that responds only to changes that occur in the first $1/n$ th segment of the product under test, gate signals $D_{12}$ along with $D_{22}$ would be used for the second $1/n$ th segment of the product, and so on. By using this variation of the simplified version of the device shown in FIGS. 1 through 4, the operator of the equipment being monitored would be capable of detecting and correcting any side-to-side variations in the latex coating on the product that may occur from time to time.

The practical limitation on the number channels that could be implemented, would be determined by requirements of the manufacturer and also the basic resolution of the system. For manufacturers in the carpet industry, three segments would be sufficient, whereas manufacturers in the textile industry may require say five segments and manufacturers in the paper industry may require say eight segments. For more than ten segments in ten feet, however, the coaxial losses of the system would begin to reduce the high frequency response to such a degree that either a very short cable would be required, or the sensor bars would need to be run diagonally across the product to increase the effective width of the product.

The timing circuits 11 of FIG. 2 receive the horizontal retrace and vertical output signals from the time domain reflectometer (TDR) unit 1 of FIG. 1. As mentioned above, the unit 1, is of itself a known and commercially available unit, and a detailed description of the unit is believed unnecessary for purposes of the present invention. The timing circuits 11 are used to generate the analog switch drives shown in FIG. 4, which are used to control the analog switches represented by the block 13 of FIG. 2.

Stability with time and temperature is of the utmost importance in the generation of the waveforms D1 and D2 shown in FIG. 4. The temperature may range, for example, from 0° C to 50° C, and over this range, the length of the sample gates $D_1$ and $D_2$ (FIG. 3) and their position with respect to the trigger discontinuity, must not vary more than 1 percent.

The horizontal retrace signal from the TDR1 is used to reset all the logic elements to 0, so that they will accept a subsequent trigger signal. The trigger signal is derived from the leading edge of the most negative discontinuity in the vertical output signal from the TDR 1. After the trigger signal is received, the logic proceeds to generate its output waveforms, and it is undisturbed by any further trigger signals until after the next horizontal retrace signal occurs.

The dot generator 15 utilizes a full wave differentiating circuit to produce an output pulse at the beginning and at the end of each sample gate drive signal $D_1$ and $D_2$. These pulses are transmitted back to the dot generator in the TDR 1, which produces a high intensity dot on the cathode-ray tube display screen 1A at each end of both sample gates. These dots indicate that the logic has locked itself with the incoming signal, and they may also be used to locate the edges of the product being monitored, so that the sample gates may be readily adjusted to the proper length.

It should be pointed out at this time that the various details of the blocks of FIG. 2 are well known to the electronic art, and a detailed description of these blocks is believed to be unnecessary for purposes of the present invention.

The analog switches 13 may be made up of two M.O.S.-field effect transistors which provide excellent isolation when turned off, and very low resistance when turned on. These switches have associated with them an interface/driver circuit, all of which may be contained in a single package. The analog switches are driven by the logic signals D1 and D2, and they cause the vertical output signal to be sampled at the time indicated by the diagram of FIG. 4. The output signal sampled at the $D_1$ time is inverted by the inverter 33 for reasons explained above.

The output signals are then applied to the summing integrator 35 which, for example, consists of a low drift, integrated circuit, operational amplifier with high open-loop gain. The integrator may include a feedback network consisting of a parallel combination of a resistor and a capacitor. The resistor is selected to give the desired gain with respect to precision input resistors, and the capacitor is selected to provide a time constant of 1 second or more. The feedback network serves to integrate and smooth out the direct current sample pulses so as to provide a slowly varying direct current output voltage.

The bias and gain controls represented by the block 37 may be made up of two-pole multi-position switches and a potentiometer for each bias switch position, and also an individual potentiometer for each gain switch position. All of the gain potentiometers are connected in parallel between the summing integrator output and ground, while the variable tap on each gain potentiometer is connected to a separate position of the gain switch. The common terminal of the gain switch is connected to one input resistor of the buffer amplifier 39.

Each bias potentiometer, on the other hand, is connected through appropriate dropping resistors to a plus and a minus voltage so as to provide a range of offset voltages to counter-act the direct current output of the summing integrator 35 when the sensor bars 16 and 18 have no product passing between them.

The variable tap of each bias potentiometer is connected to a separate position on the bias switch, and the common terminal of the bias switch is connected to the other input resistor of the buffer amplifier. The bias potentiometers are adjusted separately to produce a voltage equal in magnitude and of opposite polarity to that present at the output of the summing integrator 35 for the difference sets of sensor bars 16 aNd 18, when the bars are in their 0 state.

The buffer amplifier 39 acts as a direct current summing amplifier, and its output is the inverted algebraic sum of the bias potentiometer and the summing integrator output from the corresponding gain potentiometer. The adjustment of the bias potentiometer is such that the output of the buffer amplifier 39 is 0 when there is no product passing between the sensor bars. The output of the buffer amplifier 39 is used to drive the pen of the recorder 8 which, for example, is a strip chart record, and/or to drive a display meter, so as to indicate the amount of moisture present in the product as it passes between the sensor bars.

Figure 6:
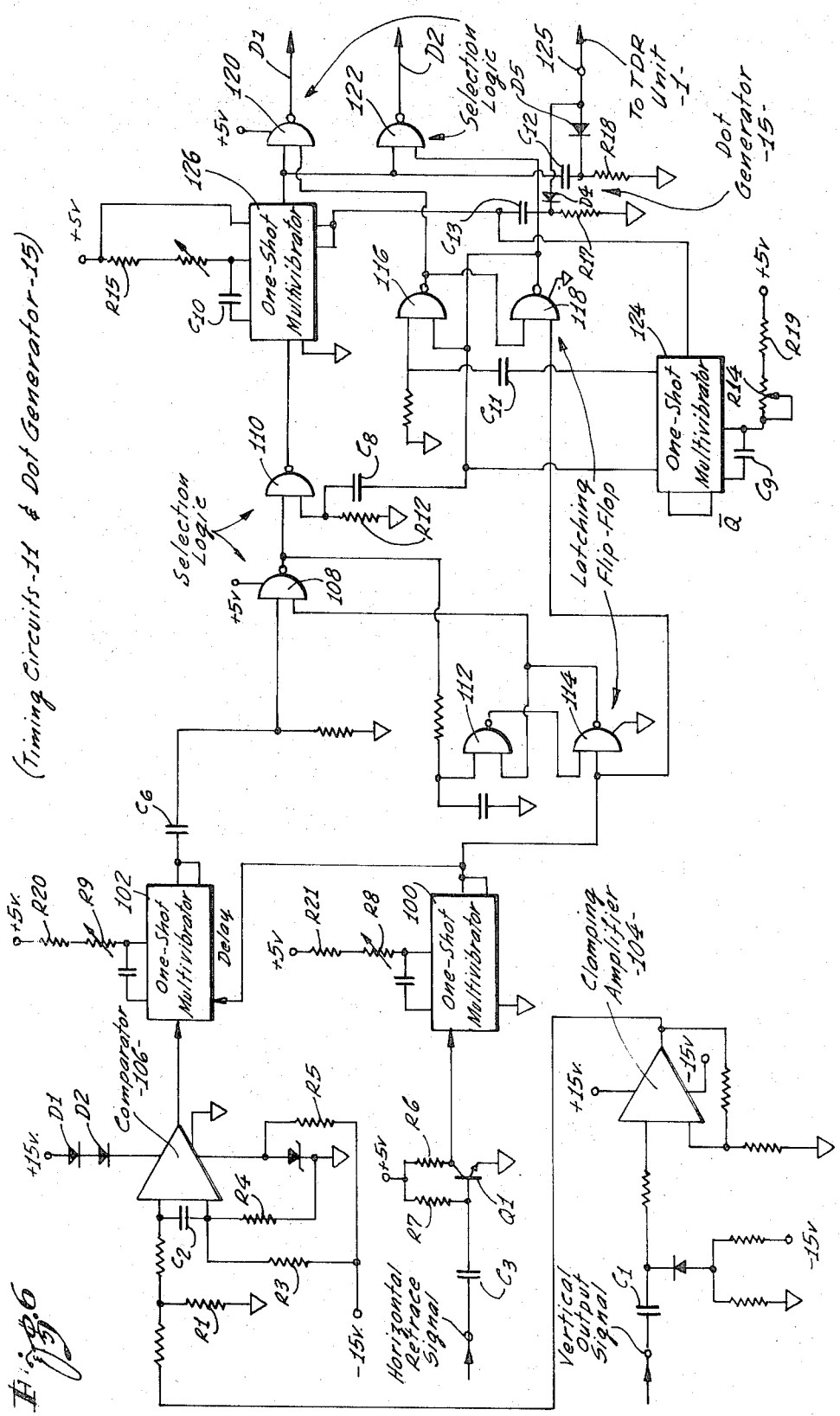

The timing circuits 11 and dot generator 15 of FIG. 2 are shown in circuit detail in FIG. 6. As shown in FIG. 6, the horizontal retrace signal from the time domain reflectometer unit 1 of FIG. 1 is introduced through a 0.005 microfarad coupling capacitor C3 to the base of an NPN transistor Q1. The transistor Q1 may be of the type designated 2N2222. Its emitter is connected to the point of reference potential, and its collector is connected through a 1 kilo-ohm resistor R6 to the positive terminal of a 5-volt DC source. The base of the transistor Q1 is also connected to that terminal through an 8.2 kilo-ohm resistor R7. The collector of the transistor Q1 is connected to a one-shot multivibrator represented by the block 100. The output of the one-shot multivibrator 100 is connected to a one-shot multivibrator 102.

The vertical output signal from the time domain reflectometer unit 1 of FIG. 1 is coupled through a 0.15 microfarad coupling capacitor $C_1$ to a clamping amplifier 104 whose output is connected to a comparator 106. The output of the comparator 106 is also connected to the one-shot multivibrator 102. The output of the one-shot multivibrator 102 is coupled through a 0.001 microfarad capacitor C6 to a gate 108 which, in conjunction with a second gate 110 forms a selection logic circuit. A latching flip-flop formed of gates 112, 114, 116 and 118 is connected to the selection logic gate 110, and to further selection logic gates 120 and 122, as shown. The gate signals D1 and D2 appear at the outputs of the gates 120 and 122 respectively.

The circuit also includes a one-shot multivibrator 124 connected as shown and a further one-shot multivibrator 126 which generates the gate signals D1 and D2 respectively. The dots are produced in a differentiator network formed of a pair of 0.001 microfarad capacitors C12 and C13, and a pair of 6.8 kilo-ohm resistors R17 and R18 connected to the reference point. The dots are formed at an output terminal 124 connected to the time domain reflectometer unit 1. The latter connection is made through a pair of diodes D4 and D5.

Figure 7:
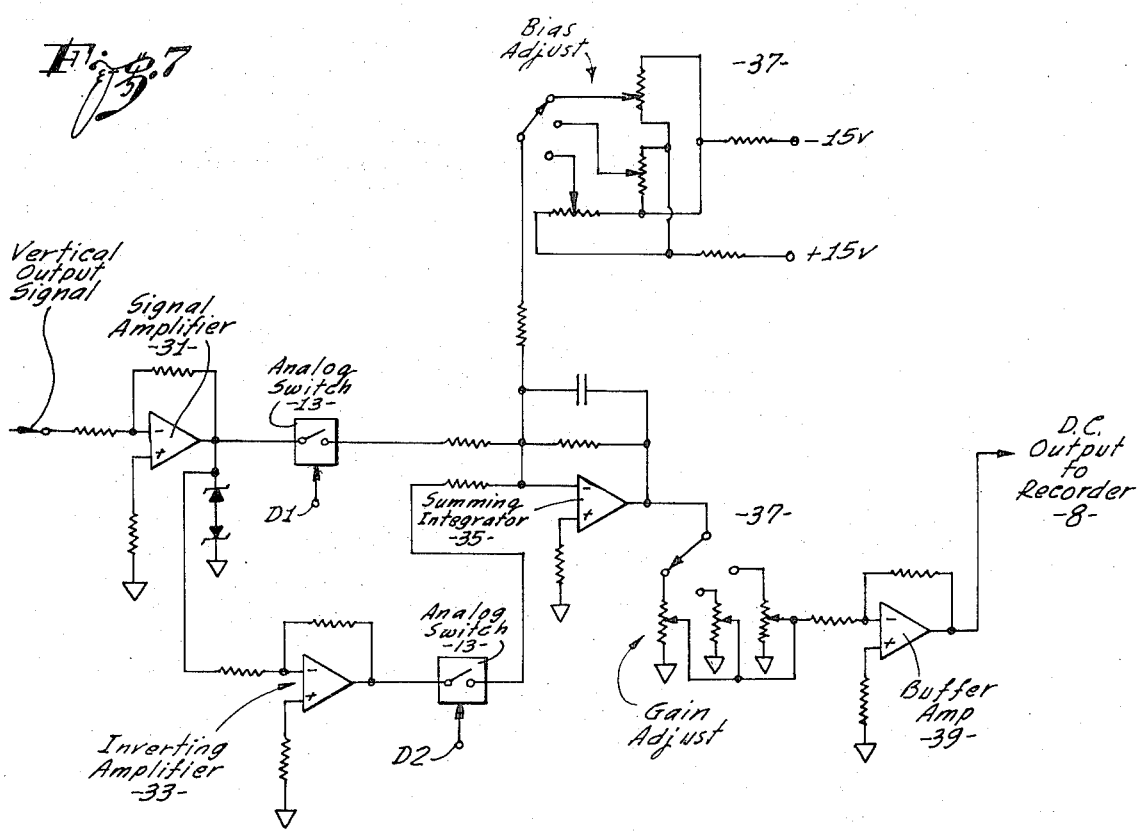
FIGS. 6 and 7 are circuit diagrams of certain of the components of the system of FIGS. 1 and 2.

The circuit details of the signal amplifier 31 and inverting amplifier 33 are shown in FIG. 7. Also shown are the components of the analog switch 13 and the summing integrator 35. The bias and gain adjustment potentiometers are also shown, as connected to the input and output of the summing integrator 35. The gain adjust potentiometers are connected to the buffer amplifier 39, as shown, and the DC output of which is applied to the recorder 8.

It will be appreciated, therefore, that although a particular embodiment has been shown and described, modifications may be made of the invention. The following claims are intended to cover all such modifications which fall within the spirit and scope of the invention.

What is claimed is:

1. Apparatus for sensing the amount of dielectric coating applied to a web-like carrier, said apparatus comprising: a pair of spaced electrically conductive elongated sensor bars which serve as a two-wire transmission line between which the web-like carrier and its dielectric coating are drawn, and which extend transversely of the web-like carrier; and a time domain reflectometer circuit electrically connected to said sensor bars to transmit electric pulses down the transmission line and to receive pulses reflected from the dielectric coating so as to measure changes in the amount of moisture in said dielectric coating as the web-like carrier is drawn between said sensor bars.

2. The apparatus defined in claim 1, in which said time domain reflectometer circuit includes an oscilloscope display means and an electric pulse generating circuit, and which includes an electrically conductive coaxial cable connecting said pulse generating circuit to said sensor bars.

3. The apparatus defined in claim 2, and which includes a transition connector connecting said coaxial cable to the two-wire transmission line formed by said sensor bars.

4. Apparatus for sensing the amount of dielectric coating applied to a web-like carrier, said apparatus comprising: a pair of spaced electrically conductive elongated sensor elements which serve as a two-wire transmission line between which the web-like carrier and its dielectric coating are drawn, and which extend transversely of the web-like carrier; a time domain reflectometer circuit electrically connected to said sensor elements to transmit electric pulses down the transmission line and to receive pulses reflected from the dielectric coating so as to measure changes in the amount of moisture in said dielectric coating as the web-like carrier is drawn between said sensor bars; and signal condition electronic circuitry coupled to said time domain reflectometer circuit to eliminate the effects of drift in the system.

5. The apparatus defined in claim 4, in which said signals conditioning electronic circuitry includes means for sampling two reflected signals from said reflectometer circuit, means for inverting one of the sampled signals, and integrator means for summing the sampled signals to produce a direct current output signal having an amplitude directly proportional to the average difference of impedance in the sampled areas.

6. The apparatus defined in claim 3, and which includes a recorder connected to said signal conditioning electronic circuitry for recording said direct current output signal.

7. The apparatus defined in claim 5, and which includes an impedance step element interposed in said coaxial cable, and in which said sampling means in said electronic circuitry samples a reference signal corresponding to a portion of the length of said coaxial cable connecting said impedance step element to said sensor elements.

8. The apparatus defined in claim 7, in which said sampling means of said electronic circuitry samples the second signal to correspond to a transverse portion of said web-like carrier.

9. The apparatus defined in claim 1, in which said dielectric coating applied to said web-like carrier comprises latex applied to a carpet.

10. The apparatus defined in claim 2, in which one of said bars constitutes a signal bar and the other of said bars constitutes a ground bar, and which includes a transition cone mounted at one end of said signal bar to connect said signal bar to said coaxial cable.

11. Apparatus for sensing the amount of dielectric coating applied to a web-like carrier, said apparatus comprising: a pair of spaced electrically conductive elongated sensor elements which serve as a two-wire transmission line between which the web-like carrier and its dielectric coating are drawn, and which extend transversely of the web-like carrier; a time domain reflectometer circuit electrically connected to said sensor elements to transmit electric pulses down the transmission line and to receive pulses reflected from the dielectric coating so as to measure changes in the amount of moisture in said dielectric coating as the web-like carrier is drawn between said sensor elements; and which includes signal conditioning electronic circuitry coupled to said time domain reflectometer circuit to eliminate the effects of drift in the system, said signal conditioning circuitry including a plurality of sampling means, each sampling two reflected signals corresponding to different side-by-side segments of the dielectric coating on the web-like carrier; and each of said sampling means including means for inverting one of the sampled signals, and integrator means for summing the sampled signals to produce a direct current output signal having an amplitude directly proportional to the average difference of impedance in the sampled segments.

* * * * *